US010265855B2

(12) United States Patent
Myeong et al.

(10) Patent No.: US 10,265,855 B2
(45) Date of Patent: Apr. 23, 2019

(54) WALL-CLIMBING AERIAL ROBOT MECHANISM AND METHOD OF CONTROLLING THE SAME

(71) Applicant: Korea Advanced Institute of Science and Technology, Daejeon (KR)

(72) Inventors: Hyeon Myeong, Daejeon (KR); Wancheol Myeong, Daejeon (KR); Kwang Yik Jung, Daejeon (KR); Yonghun Jeong, Daejeon (KR); Jae-Uk Shin, Daejeon (KR)

(73) Assignee: Korea Advanced Institute of Science and Technology (KR)

( * ) Notice: Subject to any disclaimer, the term of this patent is extended or adjusted under 35 U.S.C. 154(b) by 141 days.

(21) Appl. No.: 15/335,730

(22) Filed: Oct. 27, 2016

(65) Prior Publication Data

US 2017/0123435 A1     May 4, 2017

(30) Foreign Application Priority Data

Oct. 27, 2015  (KR) .................. 10-2015-0149203

(51) Int. Cl.
*G06F 19/00* (2018.01)
*B25J 9/16* (2006.01)
*B64C 39/02* (2006.01)

(52) U.S. Cl.
CPC .......... *B25J 9/1676* (2013.01); *B25J 9/1697* (2013.01); *B64C 39/024* (2013.01);
(Continued)

(58) Field of Classification Search
CPC ..... B25J 9/1676; B25J 9/1697; B64C 39/024; B64C 2201/027; B64C 2201/12; B64C 2201/18; G05B 2219/40544
(Continued)

(56) References Cited

U.S. PATENT DOCUMENTS 3,096,046 A  *  7/1963  Kendall, Jr. ......... G05D 1/0033
                                                    244/17.13
7,551,419 B2 *  6/2009  Pelrine ................... H02N 13/00
                                                       361/234
(Continued)

FOREIGN PATENT DOCUMENTS

KR     1020130098062 A    9/2013

OTHER PUBLICATIONS

Technical Program: ICCES'15 Reno, NV, USA, Jul. 20-24, 2015, Reno, NV, USA. Jung, et al. , "Design of UAV (Unmanned Aerial Vehicle)—type wall-climbing robot for inspection of wind blades", Korea Advanced Institute of Science and Technology, Daejeon, Korea.
(Continued)

*Primary Examiner* — Ronnie M Mancho

(57) ABSTRACT

Disclosed are a wall-climbing aerial robot mechanism and a method of controlling the same. The method of controlling a wall-climbing aerial robot includes allowing the aerial robot to fly towards a structure, allowing the aerial robot to approach the structure and recognize a wall of the structure, allowing the aerial robot to calculate a trajectory for landing on the wall of the structure, approach the wall of the structure after taking an orientation, and be attached on the wall of the structure, and allowing the aerial robot to move along the wall of the structure to perform a task.

20 Claims, 16 Drawing Sheets

(52) U.S. Cl.
CPC .... *B64C 2201/027* (2013.01); *B64C 2201/12* (2013.01); *B64C 2201/18* (2013.01); *G05B 2219/40544* (2013.01)

(58) Field of Classification Search
USPC .................................................. 700/245, 259
See application file for complete search history.

(56) References Cited

U.S. PATENT DOCUMENTS

| | | | | |
|---|---|---|---|---|
| 9,028,312 | B1* | 5/2015 | Wei | A63F 13/02 463/2 |
| 9,720,519 | B2* | 8/2017 | Verma | G06F 3/0304 |
| 9,987,506 | B2* | 6/2018 | Marcus | A62B 5/00 |
| 2009/0265193 | A1* | 10/2009 | Collins | G06Q 30/0185 705/4 |
| 2010/0108807 | A1* | 5/2010 | Barrett | B64C 27/20 244/1 N |
| 2012/0303179 | A1* | 11/2012 | Schempf | B25J 11/002 701/2 |
| 2015/0344136 | A1* | 12/2015 | Dahlstrom | B64C 39/024 701/3 |
| 2016/0041628 | A1* | 2/2016 | Verma | G06F 3/0304 345/156 |
| 2016/0378109 | A1* | 12/2016 | Raffa | G05D 1/0038 701/2 |
| 2017/0185954 | A1* | 6/2017 | McAllister | G06Q 10/087 |
| 2018/0155018 | A1* | 6/2018 | Kovac | B64C 29/0016 |

OTHER PUBLICATIONS

Myeong, et al., "Drone-Type Wall-Climbing Robot Platform for Structural Health Monitoring" 6$^{th}$ International Conference on Advances in Experimental Structural Engineering, 11$^{th}$ International Workshop on Advanced Smart Materials and Smart Structures Technology. Aug. 1-220. 2015, University of Illinois, Urbana-Champaign, United States.

IWSHM 10$^{th}$ International Workshop on Structural Health Monitoring 2015 (Sep. 1-3, 2015). Shin, et al., "Quadrotor-based wall-climbing robot for structural health monitoring".

Myeong, et al., "A drastic pose change and perching algorithm for the wall climbing drone", 2015 IEEE/RSJ International Conference on Intelligent Robots and Systems (IROS), Congress Center Hamburg, Sep. 28-Oct. 2, 2015, Hamburg, Germany.

* cited by examiner

Flying condition $$F_T = \sum_{n=1}^{4} F_n \qquad\qquad f_n = \mu F_n$$
$$f_T = \sum_{n=1}^{4} f_n = \mu F_n$$

$\boxed{F_T > W}$ :flyable $\boxed{f_T(=\mu F_T) > W}$ :stickable $\boxed{\mu_{(>1)} F_T > F_T > \mu_{(<1)} F_T > W}$ :flyable & stickable $\mu_{(>1)} F_T > F_T > W_{(\mu>1)}$ or $F_T > \mu_{(<1)} F_T > W_{(\mu<1)}$

WALL-CLIMBING AERIAL ROBOT MECHANISM AND METHOD OF CONTROLLING THE SAME

CROSS-REFERENCE TO RELATED APPLICATIONS

A claim for priority under 35 U.S.C. § 119 is made to Korean Patent Application No. 10-2015-0149203 filed Oct. 27, 2015, in the Korean Intellectual Property Office, the entire contents of which are hereby incorporated by reference.

BACKGROUND

Embodiments of the inventive concept described herein relate to a wall-climbing aerial robot mechanism and a method of controlling the same. More particularly, they relate to an aerial robot type wall-climbing aerial robot, and also relate to an aerial robot mechanism that may fly and climb a wall as well as a method of controlling the same.

In recent years, as structures such as buildings or bridges have been large-scaled and have become higher and the existing large-scale structures have been aged, the importance of inspect of the structures are increasing. However, because the inspectors have to move directly to the inspection areas to perform the existing inspections, problems such as a high dependency on manpower, a high danger due to the characteristics of the work spaces, inspection costs, and lack of specialized manpower exist. As one of the methods for solving the problems, wall-climbing robots that may move on inner and outer rails of large-scale structures have been actively studied.

The wall-climbing robots may be utilized for maintaining of high structures or large-scale structure that cannot be easily approached, for cleaning outer walls, or diagnosing the health of the structures. In particular, when the structures are solar cell panels in cities, power generation efficiency deteriorates over time due to the contaminants. Accordingly, the solar cell panels have to be maintained continuously and periodically, but there is a limit in applying an infra-based system to the solar cell panels due to the shapes and arrangements of the solar cell panels.

The studies on the wall-climbing robots have been made from a long time ago due to the realistic necessities such as cleaning, maintenance, and diagnoses of the structures. Meanwhile, due to the characteristics of the wall-climbing aerial robots, a danger of crashes is always present, and the aerial robots fail to satisfy the technical maturity that is high enough to overcome the disadvantages, making it difficult to commercialize the aerial robots.

Although an infra-based wall-climbing aerial robot system, such as a rail or a crane/wire, has been developed and managed to overcome the disadvantage until now, the shapes of the applicable structures are restricted due to the characteristics of the infra-based system, and efficiency deteriorates when the structure is not a structure of a certain size or larger.

Korean Patent Application Publication No. 10-2013-0098062 relates to an outer wall climbing robot that may fly, and describes a technology of an outer wall climbing robot that may fly, which improves movement and control performances of landing and take-off by adding an operational force for flight together with driving wheels.

SUMMARY

Embodiments of the inventive concept provide a wall-climbing aerial robot mechanism and a method of controlling the same, and more particularly, provide an aerial robot type wall-climbing aerial robot that includes an aerial robot mechanism that may allow the aerial robot to fly and climb a wall with a force that may attach the aerial robot to the wall with a thrust force of a rotor in a non-infra based aerial robot platform, and a method of controlling the same.

Embodiments of the inventive concept also provide a wall-climbing aerial robot mechanism that may allow an aerial robot to start from the ground without any help of an operator, be automatically attached to a wall, perform a given task, and be detached from the wall, may be applied regardless of the type and state of the wall, and may overcome an obstacle by changing a flight mode and a climbing mode when the obstacle is on the wall, and a method of controlling the same.

In accordance with an aspect of the inventive concept, there is provided a method of controlling a wall-climbing aerial robot, the method including allowing the aerial robot to fly towards a structure, allowing the aerial robot to recognize a wall of the structure by using a sensor or a camera, allowing the aerial robot to calculate a trajectory for the aerial robot landing on the wall of the structure, allowing the aerial robot to take an orientation depending on the trajectory to approach the wall of the structure, allowing the aerial robot to land on the wall of the structure, and allowing the aerial robot to move along the wall of the structure to perform a task.

Here, the recognizing of the wall of the structure may include recognizing the wall through a sonar sensor or an RGB-D camera sensor and measuring a distance from the wall.

The allowing the aerial robot to calculate the trajectory may further include allowing the aerial robot to express dynamics of the aerial robot in differential equations for an angular acceleration, an angular velocity, and an orientation, and reflect a measured distance from the wall and a weight and an inertial moment of the aerial robot to calculate a thrust force of a rotor, and the allowing the aerial robot to take an orientation may include allowing the aerial robot to take an orientation by applying the calculated thrust force of the rotor and approach the wall of the structure along the trajectory.

In the allowing the aerial robot to move along the wall of the structure, when an obstacle is on the wall of the structure, a flight mode in which the aerial robot flies with the rotors and a climbing mode in which the aerial moves with wheels may be automatically changed such that the aerial robot may pass by the obstacle.

In the allowing the aerial robot to land on the wall of the structure, an attachment force towards the wall may be generated by applying the thrust force of the aerial robot toward the wall of the structure such that the aerial robot may be landed on the wall of the structure.

The method may further include allowing the aerial robot to fly and be detached from the wall of the structure after moving along the wall of the structure to perform a task.

In accordance with another aspect of the inventive concept, there is provided a wall-climbing aerial robot mechanism, the mechanism including a flight controller that controls a flight of the aerial robot, a wall recognition unit that senses a wall of a structure, and a main processor that receives information sensed by the wall recognition unit and calculates a trajectory for landing, wherein the flight controller may allow the aerial robot to take an orientation along the trajectory, approach the wall of the structure, land, and move along the wall of the structure to perform a task. Here, the wall recognition unit may recognize the wall through a distance sensor or a camera, and may measure a distance between the aerial robot and the wall.

The main processor may calculate a thrust force by using an optimization algorithm by expressing dynamics of the aerial robot in differential equations for an angular acceleration, an angular velocity, and an orientation, and reflecting specifications of the aerial robot.

The flight controller may change a flight mode and a climbing mode to allow the aerial robot to pass by an obstacle when the obstacle is on the wall of the structure.

The flight controller may generate an attachment force towards the wall by applying the thrust force of the aerial robot toward the wall of the structure such that the aerial robot may be landed on the wall of the structure.

The flight controller may allow the aerial robot to move along the wall of the structure to perform a task, and fly to be detached from the wall of the structure.

In accordance with another aspect of the inventive concept, there is provided a method of controlling a wall-climbing aerial robot, the method including allowing the aerial robot to fly and approach a structure, allowing the aerial robot to calculating a vertical drag and a friction force between the aerial robot and the wall of the structure through a motion of the aerial robot from dynamics of the aerial robot, obtaining inverse dynamics by inversely converting the dynamics to calculate a thrust force of the aerial robot depending on an inclination of the wall, allowing the aerial robot to take an orientation to be attached on the wall of the structure, and allowing the aerial robot to move along the wall of the structure to perform a task.

Here, in the allowing the aerial robot to move along the wall of the structure, when an obstacle is on the wall of the structure, a flight mode in which the aerial robot flies with the rotors and a climbing mode in which the aerial moves with wheels may be automatically changed such that the aerial robot may pass by the obstacle.

In the allowing the aerial robot to be attached on the wall of the structure, an attachment force towards the wall may be generated by applying the thrust force of the aerial robot toward the wall of the structure such that the aerial robot may be attached on the wall of the structure.

The method may further include allowing the aerial robot to fly and be detached from the wall of the structure after moving along the wall of the structure to perform a task.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
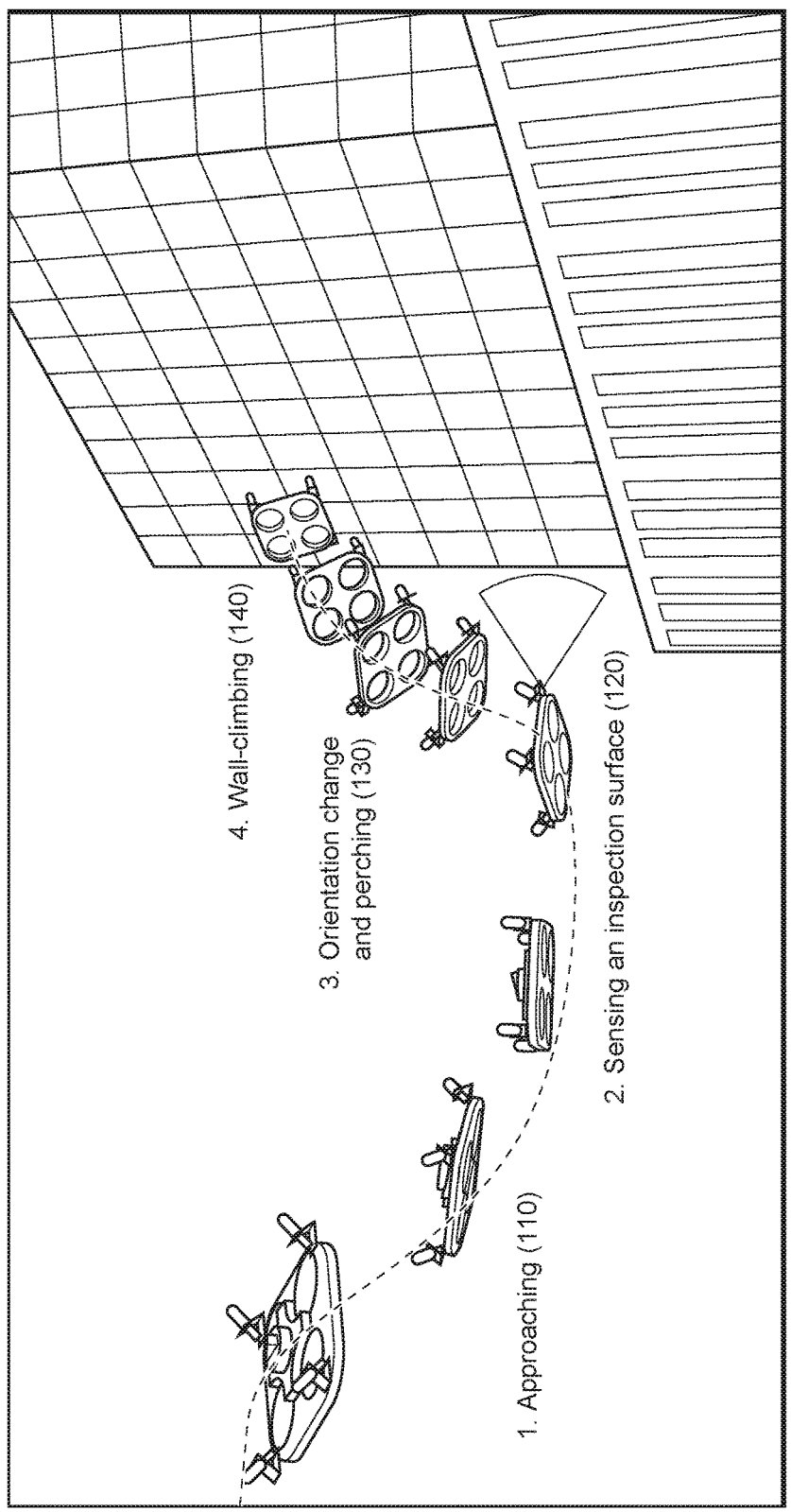
FIG. 1 is a schematic diagram for explaining a wall-climbing aerial robot mechanism according to an embodiment.

Hereinafter, embodiments of the inventive concept will be described with reference to the accompanying drawings. However, the embodiments may be modified into other various forms, and the scope of the inventive concept is not limited by the embodiments. Further, the embodiments are provided to describe the inventive concept to those skilled in the art more completely. In the drawings, the shapes and sizes of the elements may be exaggerated for clearer description.

The following embodiments relate to an aerial robot type wall-climbing aerial robot, and also relate to an aerial robot mechanism that may fly and climb a wall as well and a method of controlling the same.

FIG. 1 is a schematic diagram for explaining a wall-climbing aerial robot mechanism according to an embodiment.

Referring to FIG. 1, according to the wall-climbing aerial robot mechanism and the method of controlling the aerial robot mechanism, an aerial robot that may fly may approach (110) a vertical wall of a tall building or a large-scale structure that cannot be easily approached, may detect (120) the wall, may land (140) on the target wall through an orientation (130) of the aerial robot, and may move (travel) along the wall. Here, the basic operational principle of wall climbing is that an aerial robot may travel while a friction three between the aerial robot and a wall is maximized by applying a thrust force of a rotor of the aerial robot towards the wall and a repulsive force in the direction of travel is generated through a land travel mechanism such as wheels or a track drive.

In the method of controlling an aerial robot according to the following embodiments, although a flight controller and a flight algorithm that are used in an existing drone during a general flight may be used, the following control method may be suggested when the aerial robot recognizes a wall, lands (or is attached) on the wall, and travels (moves) on the wall after arriving at a target location.

First, the landing method of the aerial robot may be largely classified into a contact type and a non-contact type. The contact type may be utilized when a frictional coefficient of contact portions of a wall and an aerial robot is known. In this case, because a force that is applied between the wall and the aerial robot may be estimated, the aerial robot may be landed stably as compared with the non-contact type while the wall and the aerial robot interact with each other.

In particular, because the aerial robot may supplement an upward thrust force by generating a friction force in a direction that is opposite to the direction of the gravitational force while contacting the wall, abrupt conversion of a posture of the aerial robot, for maintaining a rising speed of the aerial robot as in the non-contact type is not necessary so that a landing impact may be reduced by allowing the aerial robot to take an orientation at a slow speed.

Meanwhile, the non-contact type is devised with the realistic assumption that the frictional coefficient of the contact portions of the wall and the aerial robot cannot be always known. Further, a stable contact cannot be achieved by a dynamic interaction between a thrust force generated when the aerial robot approaches the wall and air between the aerial robot and the wall and other environmental turbulences, the aerial robot may promptly take an orientation in a relatively short time by calculating a trajectory for optimum landing of the aerial robot.

In more detail, the aerial robot may approach a wall, recognize the wall through a sonar sensor or an RGB-D camera, and measure a distance from the wall. The aerial robot may be controlled by calculating a thrust force of the aerial robot through differential equations and other optimization algorithms such as a particle filter based on the dynamics of the aerial robot by using the measured distance between the aerial robot and the wall, the specifications of the aerial robot (the weight, the inertial moment, and the like), and an optimum landing condition.

Hereinafter, an embodiment of the non-contact type wall-climbing aerial robot mechanism will be described in detail.

Figure 2:
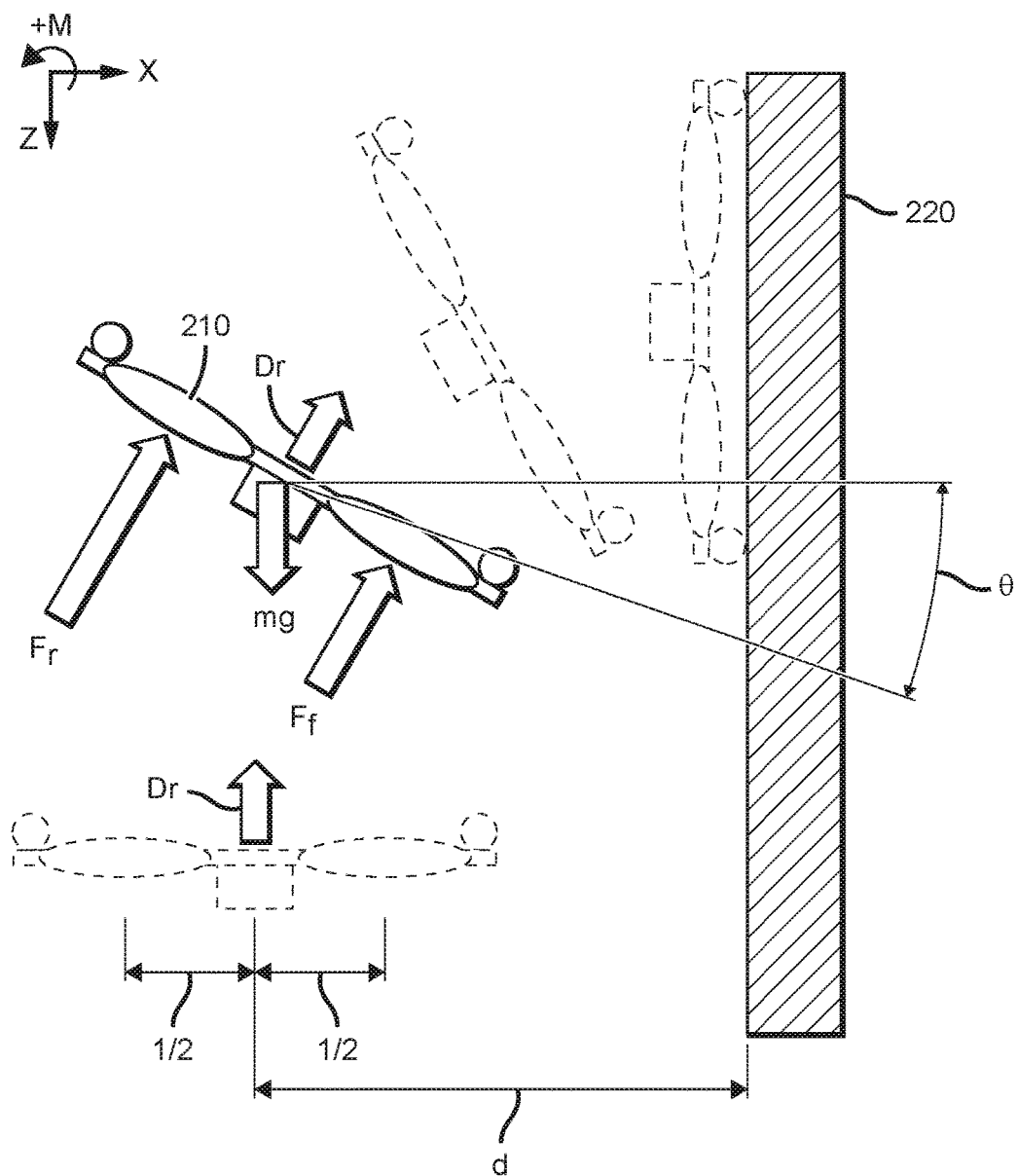
FIG. 2 is a diagram for explaining a non-contact type wall-climbing aerial robot mechanism according to an embodiment.

FIG. 2 is a diagram for explaining a non-contact type wall-climbing aerial robot mechanism according to an embodiment.

Referring to FIG. 2, the non-contact type wall-climbing aerial robot may include a flight controller and a wall recognition unit, and may further include a main processor according to an embodiment.

The flight controller is adapted to control flight of the aerial robot 210, and may allow the aerial robot 210 to fly from the ground and approach a structure that is a target object and may allow the aerial robot 210 to be detached from the wall 220 of the structure and land on the ground after the task.

The wall recognition unit may recognize the wall 20 of the structure by using a sensor or a camera when the aerial robot 210 flies and approaches to the structure that is the target object. Here, the sensor may be a distance sensor, and for example, the wall recognition unit recognize the wall 220 through a sonar sensor or an RGB-D camera sensor and may measure a distance from the wall 220.

For example, the wall recognition unit may recognize a contact with the wall 220 of the structure by using a physical touch sensor formed in the aerial robot 210. As another example, the wall recognition unit may recognize a location of the aerial robot 210 through a Monte Carlo localization (MCL) of real-time data values of the distance sensor of the aerial robot 210 and map information stored in advance, and may recognize the wall 220 of the structure by calculating a distance from the wall 220 of the structure with reference to the location of the aerial robot 210. As another example, the wall recognition unit may recognize the wall 220 of the structure by mutually supplementing a distance measurement value based on sonar sensor data formed in the aerial robot 210 and a distance measurement value based on the depth value of the RGB-D sensor.

Meanwhile, according to an embodiment, the non-contact type wall-climbing aerial robot mechanism may further include a main processor.

The main processor may receive information sensed by the wall recognition unit and may calculate a trajectory for flowing the aerial robot 210 to stably land on the wall 220.

Further, the wall recognition unit may obtain a trajectory by representing the dynamics of the aerial robot 210 in differential equations on an angular acceleration, an angular velocity, and an orientation, and reflecting the specifications such as a distance from the wall 220 measured through a sensor, the weight of the aerial robot 210, and the inertial moment to calculate a thrust force by using an optimization algorithm.

The flight controller may move the aerial robot 210 to allow the aerial robot 210 to take an orientation and approach the wall 220 of the structure according to the trajectory calculated by the wall recognition unit. Further, the flight controller may apply a thrust force generated by the rotor of the aerial robot 210 towards the wall 220 of the structure to generate an attachment force towards the wall 220 such that the aerial robot 210 lands on the wall 220. In more detail, the flight controller may apply the thrust force of the rotor calculated by the main processor to allow the aerial robot 210 to take an orientation and approach the wall 220 of the structure such that the aerial robot 210 may be stably attached to the wall 220 of the structure.

Further, the flight controller may allow the aerial robot 210 to perform a task by controlling the aerial robot 210 such that the aerial robot 210 moves along the wall 220 of the structure after landing on the wall 220 of the structure. When an obstacle is on the wall 220 of the structure, the flight controller may automatically change a flight mode and a climbing mode to allow the aerial robot 210 to pass by the obstacle.

In this way, a stable contact cannot be achieved by a dynamic interaction between a thrust force generated when the aerial robot 210 approaches the wall 220 and air between the aerial robot 210 and the wall 220 and other environmental turbulences, the aerial robot 210 may promptly take an orientation in a relatively short time by calculating a trajectory for optimal landing of the aerial robot 210.

Here, when approaching the wall, the aerial robot may recognize the wall through a sensor (a distance sensor) such as a sonar sensor or an RGB-D camera, and measure a distance from the wall. The aerial robot may be controlled by calculating a thrust force of the aerial robot through differential equations and other optimization algorithms such as a particle filter based on the dynamics of the aerial robot to obtain a trajectory for landing by using the measured distance between the aerial robot and the wall, the specifications of the aerial robot (the weight, the inertial moment, and the like), and an optimum landing condition.

As another example, the flight controller may change the form of the aerial robot 210 into an attachable form and allow the aerial robot 210 to be attached to the wall 220 of the structure via at least some of a plurality of rotors that generate a thrust force in a rising direction $D_r$ of the aerial robot 210.

In this way, according to an embodiment, an aerial robot mechanism that allows flight and wall climbing by producing a force by which the aerial robot may be attached to the wall only with a thrust force of the rotors in a non-infra aerial robot platform.

In other words, the non-contact type wall-climbing aerial robot mechanism may allow the aerial robot to land on the wall of the structure by applying a thrust fore of the rotors towards the wall of the structure and generating an attaching three towards the wall. Then, in the dynamics of the aerial robot, the aerial robot may promptly take an orientation in a relatively short time by calculating a thrust force for optimum landing based on differential equations.

Figure 10:
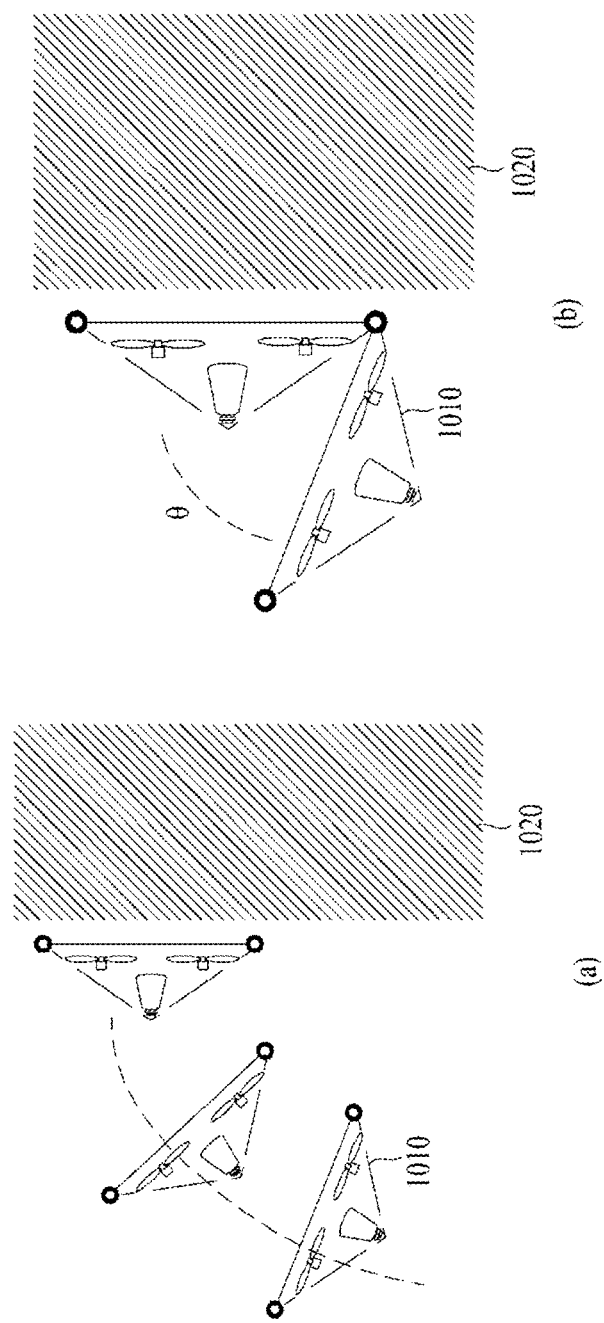
FIG. 10 is a diagram illustrating a method of calculating a trajectory of an aerial robot according to an embodiment.

In particular, as illustrated in FIG. 10, the aerial robot 1010 may land on the wall 1020 promptly and stably by calculating a trajectory (a movement path) of the aerial robot 1010 depending on an initial speed and an orientation start location while the aerial robot 1010 is not in contact with (non-contact type) the wall 1020 (state a) instead of by calculating a trajectory of the aerial robot 1010 while the aerial robot 1010 is in contact with the wall 1020 (state b).

Hereinafter, a method of calculating a thrust force of the aerial robot will be described in detail.

The dynamics of the aerial robot may be expressed in the following equation by a thrust force of the rotors and an orientation of the aerial robot.

$$m\ddot{x} = (F_r + F_f)\sin\theta$$
$$m\ddot{z} = -(F_r + F_f)\cos\theta + mg$$
$$I_{yy}\ddot{\theta} = (F_r - F_f)\frac{l}{2}$$

Here, $F_f$ denotes a force of a front rotor and $F_r$ denotes a force of a rear rotor.

With the assumption that a specific angular acceleration generates a specific thrust force, the orientation $\theta$ may be expressed as a function of time.

$$\dot{\theta} = \int \ddot{\theta} dt = 2aqt \quad \theta = \int\int \ddot{\theta} dt = aqt^2$$

An angular velocity and a displacement may be simply induced by integrating the equation with respect to time. In this way, components x and y of different directions may be expressed by a function of time.

Here, an angular acceleration may be simply expressed by using the following equation.

$$(F_r + F_f) = p$$
$$(F_r - F_f) = q$$
$$\frac{l}{4I_{yy}} = a$$
$$\theta = aqt^2$$

That is, an angular acceleration may be expressed in the following equation.

$$\ddot{x} = \frac{p\sin\theta}{m} = \frac{p\sin(aqt^2)}{m} \quad \text{[Equation 1]}$$

$$\ddot{z} = \frac{-p\cos\theta + mg}{m} = \frac{-p\cos(aqt^2) + mg}{m} \quad \text{[Equation 2]}$$

$$\ddot{\theta} = \frac{ql}{2I_{yy}} = 2aq \quad \text{[Equation 3]}$$

Further, an angular velocity may be expressed in the following equation.

$$\int m\ddot{x}dt = \dot{x} = \frac{\sqrt{2\pi}\, p\sin\operatorname{int}\left(\frac{\sqrt{2}\,t\sqrt{aq}}{\sqrt{\pi}}\right)}{2m\sqrt{aq}} \quad \text{[Equation 4]}$$

$$\int m\ddot{z}dt = \dot{z} = gt - \frac{\sqrt{2\pi}\, p\cos\operatorname{int}\left(\frac{\sqrt{2}\,t\sqrt{aq}}{\sqrt{\pi}}\right)}{2m\sqrt{aq}} \quad \text{[Equation 5]}$$

$$\int m\ddot{\theta}dt = \dot{\theta} = 2aqt \quad \text{[Equation 6]}$$

Further, an orientation of the aerial robot may be expressed in the following equation.

$$\int\int m\ddot{x}dt = x = \frac{p\cos(aqt^2)}{2amq} + \frac{\sqrt{2\pi}\, pt\sin\operatorname{int}\left(\frac{\sqrt{2}\,t\sqrt{aq}}{\sqrt{\pi}}\right)}{2m\sqrt{aq}} \quad \text{[Equation 7]}$$

$$\int\int m\ddot{z}dt = \quad \text{[Equation 8]}$$

$$z = \frac{gt^2}{2} + \frac{p\sin(aqt^2)}{2amq} - \frac{\sqrt{2\pi}\, pt\cos\operatorname{int}\left(\frac{\sqrt{2}\,t\sqrt{aq}}{\sqrt{\pi}}\right)}{2m\sqrt{aq}}$$

$$\int\int m\ddot{\theta}dt = \theta = aqt^2 \quad \text{[Equation 9]}$$

By using Equation 9, a final angle for the orientation of the aerial robot is $\pi/2$ and an arrival time t may be expressed through q ($=F_r-F_f$).

$$\frac{\pi}{2} = aqt^2 \quad t = \sqrt{\frac{\pi}{2aq}} \quad \text{[Equation 10]}$$

A ratio of thrust forces of front and rear rotors may be obtained by using a distance d between the aerial robot and the wall, which was acquired through Equation 10 and sensing. Here, the distance from the wall may mean a distance of the aerial robot from the wall in the x axis direction. Further, the ratio of the thrust forces of the front and rear rotors of the aerial robot may be expressed by q/p by using Equation 7. That is, the ratio of the thrust forces of the front and rear rotors may be obtained by reflecting the distance d from the wall and Equation 10 in Equation 7.

$$d = x = \frac{p\cos(aqt^2)}{2amq} + \frac{\sqrt{2\pi}\, pt\sin\operatorname{int}\left(\frac{\sqrt{2}\,t\sqrt{aq}}{\sqrt{\pi}}\right)}{2m\sqrt{aq}} \quad (7)$$

The speed in the z axis direction has to be zero for stable landing, and the arrival time $$\left(\left(t=\sqrt{\frac{\pi}{2aq}}\right)\right)$$

may be calculated by using p and q.

In this condition, the ratio of p and q may be obtained through Equation 5.

$$0 = \dot{z} = gt - \frac{\sqrt{2\pi}\ p\cos\mathrm{int}\left(\frac{\sqrt{2}\ t\sqrt{aq}}{\sqrt{\pi}}\right)}{2m\sqrt{aq}} \qquad (5)$$

Here, p and q denote thrust forces.

In this way, a thrust force for optimal landing may be calculated by expressing the dynamics of the aerial robot in differential equations for an angular acceleration, an angular velocity, and an orientation and reflecting a given condition and an additional condition. Accordingly, the aerial robot may promptly take an orientation depending on the calculated thrust force and trajectory.

Here, the given condition may be the specifications such as an initial distance between the aerial robot and the wall, which was measured through a sensor, the weight of the aerial robot, and the inertial moment. Further, the additional condition for safe landing is that the thrust force and the speed along the z axis direction have to be zero when the aerial robot lands on the wall. Accordingly, the ratio of the front and rear thrust forces may be verified according to a specific calculation procedure.

Hereinafter, an embodiment of a method of controlling the non-contact type wall-climbing aerial robot mechanism will be described in detail.

Figure 3:
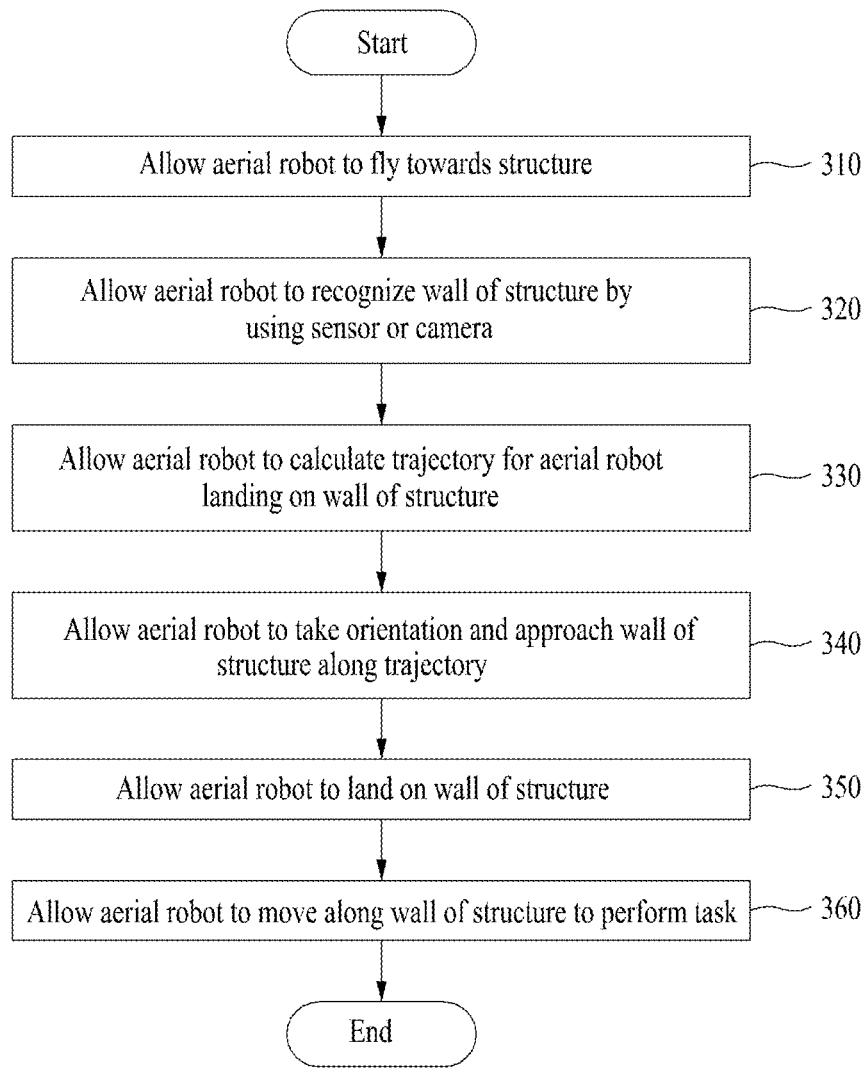
FIG. 3 is a flowchart illustrating a method of controlling a non-contact type wall-climbing aerial robot according to an embodiment.

FIG. 3 is a flowchart illustrating a method of controlling a non-contact type wall-climbing aerial robot according to an embodiment.

Referring to FIG. 3, the method of controlling a wall-climbing aerial robot according to an embodiment may include an operation of the aerial robot flying towards a structure, an operation of recognizing a wall of the structure by using a sensor or a camera, an operation of calculating a trajectory for landing on the wall of the structure, an operation of the aerial robot taking an orientation and approach the wall of the structure along the trajectory, an operation of the aerial robot landing on the wall of the structure, and an operation of the aerial robot moving along the wall of the structure to perform a task.

Here, the operation of recognizing the wall of the structure may include an operation of the aerial robot recognizing the wall through a distance sensor or a camera and measuring a distance from the wall.

Further, in the operation of landing on the wall of the structure, the aerial robot may stably land on the wall by applying a thrust force of the aerial robot towards the wall of the structure to generate an attachment force towards the wall such that the aerial robot is attached to the wall.

The method of controlling a non-contact type wall-climbing aerial robot may be performed by using the wall-climbing aerial robot described with reference to FIG. 2, and the non-contact type wall-climbing aerial robot mechanism may include a flight controller, a wall recognition unit, and a main processor.

In operation 310, the flight controller may force the aerial robot to fly from the ground towards a structure that is a target object.

In operation 320, the recognition unit may recognize a wall of the structure that is a target object, by using a distance sensor or a camera.

Here, in order to calculate a trajectory for landing, a sonar sensor or an RGB-D camera sensor attached to the aerial robot may recognize the wall and measure a distance from the wall.

In operation 330, the main processor may calculate a trajectory for landing of the aerial robot on the wall of the structure.

The main processor may receive the distance between the aerial robot and the wall, which was sensed by wall recognition unit, and may calculate a thrust force due to the rotors of the aerial robot by using differential equations of the distance from the wall, the weight of the aerial robot, and the inertial moment. The ratio of the front and rear thrust forces may be calculated by using the magnitudes of the thrust force, angular velocities of the rotors, and a final trajectory.

In operation 340, the flight controller may allow the aerial robot to take an orientation and approach the wall of the structure along the obtained trajectory. In more detail, the flight controller may allow the aerial robot to take an orientation by applying a thrust force of the rotors, which was calculated by the main processor, and may allow the aerial robot to approach the wall of the structure along the obtained trajectory.

In operation 350, the flight controller may allow the aerial robot to take an orientation and land on the wall of the structure along the obtained trajectory. For example, the aerial robot may land on a vertical wall after being inclined vertically. Here, the flight controller may allow the aerial robot to stably land on the wall by applying a thrust force of the rotors of the aerial robot towards the wall and generating an attachment towards the wall such that the aerial robot is attached on the wall of the structure.

In operation 360, the flight controller may allow the aerial robot to move along the wall of the structure to perform a task after landing on the wall. When an obstacle is on the wall of the structure, the flight controller may automatically change a flight mode in which the aerial robot is flown by the rotors and a climbing mode in which the aerial robot travels with wheels such that the aerial robot may pass by the obstacle.

Further, after the task, the flight controller may allow the aerial robot to be detached from the wall, fly, and land on the ground.

In the wall-climbing aerial robot mechanism and the method of controlling the aerial robot according to an embodiment, the aerial robot may start from the ground and be automatically attached to the wall without any help of a person, may be detached from the wall after the given task, and may be fully automatically operated.

Further, the wall-climbing aerial robot mechanism and the method of controlling the aerial robot according to an embodiment lay be applied regardless of the type and the state of the wall, and may overcome an obstacle by changing a flight mode and a climbing mode when an obstacle is on the wall.

Figure 4:
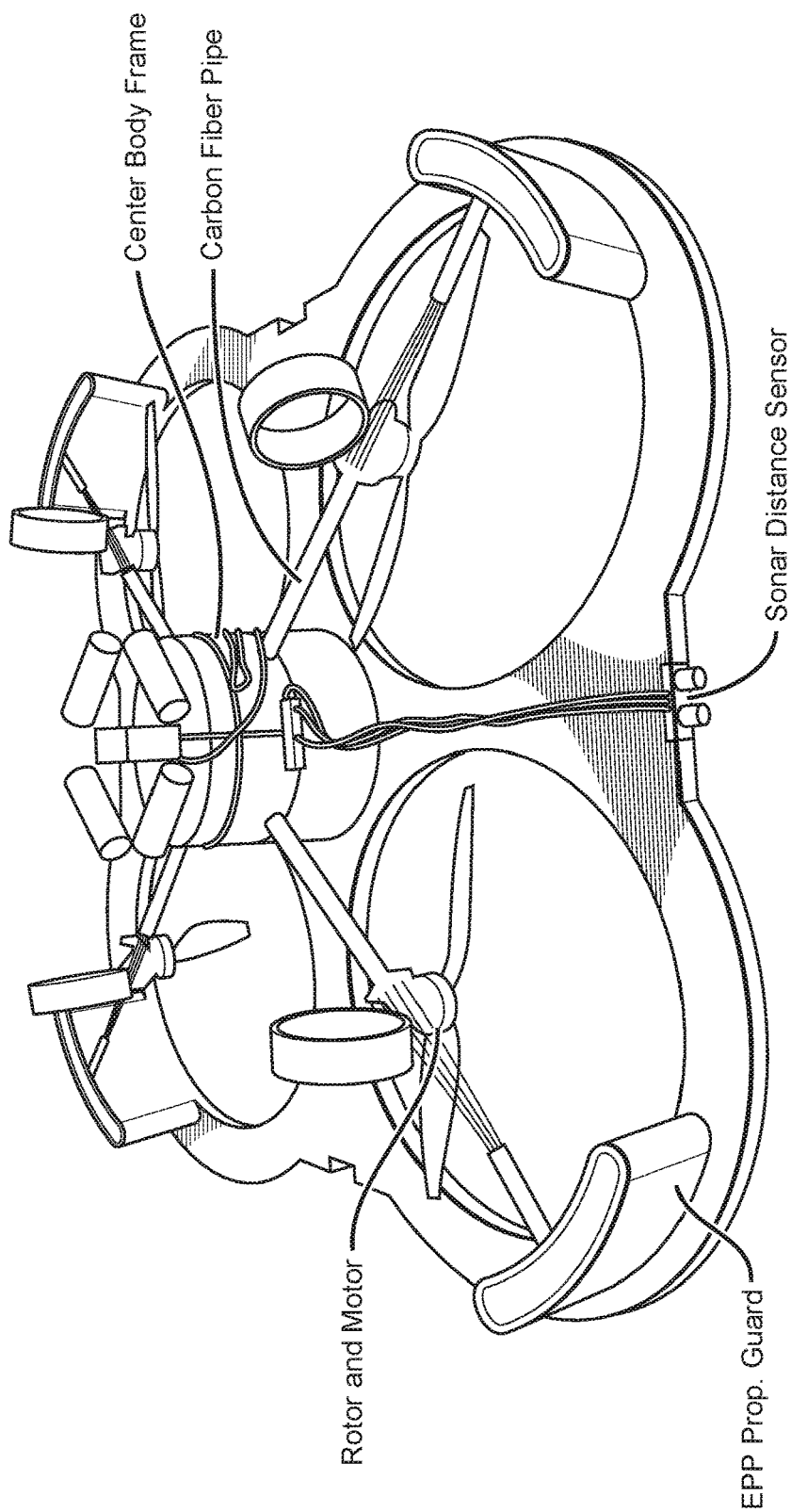
FIG. 4 is a picture illustrating an example of a non-contact type wall-climbing aerial robot according to an embodiment.

FIG. 4 is a picture illustrating an example of a non-contact type wall-climbing aerial robot according to an embodiment.

Referring to FIG. 4, the non-contact type wall-climbing aerial robot may fly with rotors and a motor (or a power source), and a distance sensor (or a sonar sensor) may be attached to the aerial robot such that the aerial robot recognizes a distance from the wall when approaching the wall. Further, a plurality of wheels may be attached to a frame such that the aerial robot may move on the wall, and a camera or a sensor that may monitor the wall may be attached to the aerial robot. Further, the non-contact type wall-climbing aerial robot may include a battery for an operation such as flight or travel and an auxiliary battery for preventing fall of the aerial robot.

For example, the non-contact type wall-climbing aerial robot may include link frames, movement units that are provided at respective ends of the link frame and include wheels for movement, a plurality of rotors that are provided on the link frames to generate an operational force for flight, and controllers that are provided at cross joint portions of the link frames to control operations of the rotors and the movement unit.

For example, the non-contact type wall-climbing aerial robot may be a quad-rotor based wall-climbing robot, and may generate a thrust force to fly by using four rotors. Further, after the aerial robot is attached to the wall, four wheels may be used such that the aerial robot may move on the wall.

The non-contact type wall-climbing aerial robot may use four rotors for more stable hovering, and may be applied to various structures such as a vertical wall or a solar cell panel as well as a horizontal wall such as a ceiling.

Further, the non-contact type wall-climbing aerial robot has a simple hardware structure that uses a thrust force of the four rotors, but uses a unique control method for change of modes (a flight mode, a travel mode, and the like), and because the aerial robot may move forwards by using the four wheels, various tasks may be performed more promptly and efficiently.

In this way, according to an embodiment, because the aerial robot basically uses universal quad-rotor hardware, it does not cause high manufacturing costs and may provide a stable and permanent platform that may continuously regenerate an attachment force.

Figure 5:
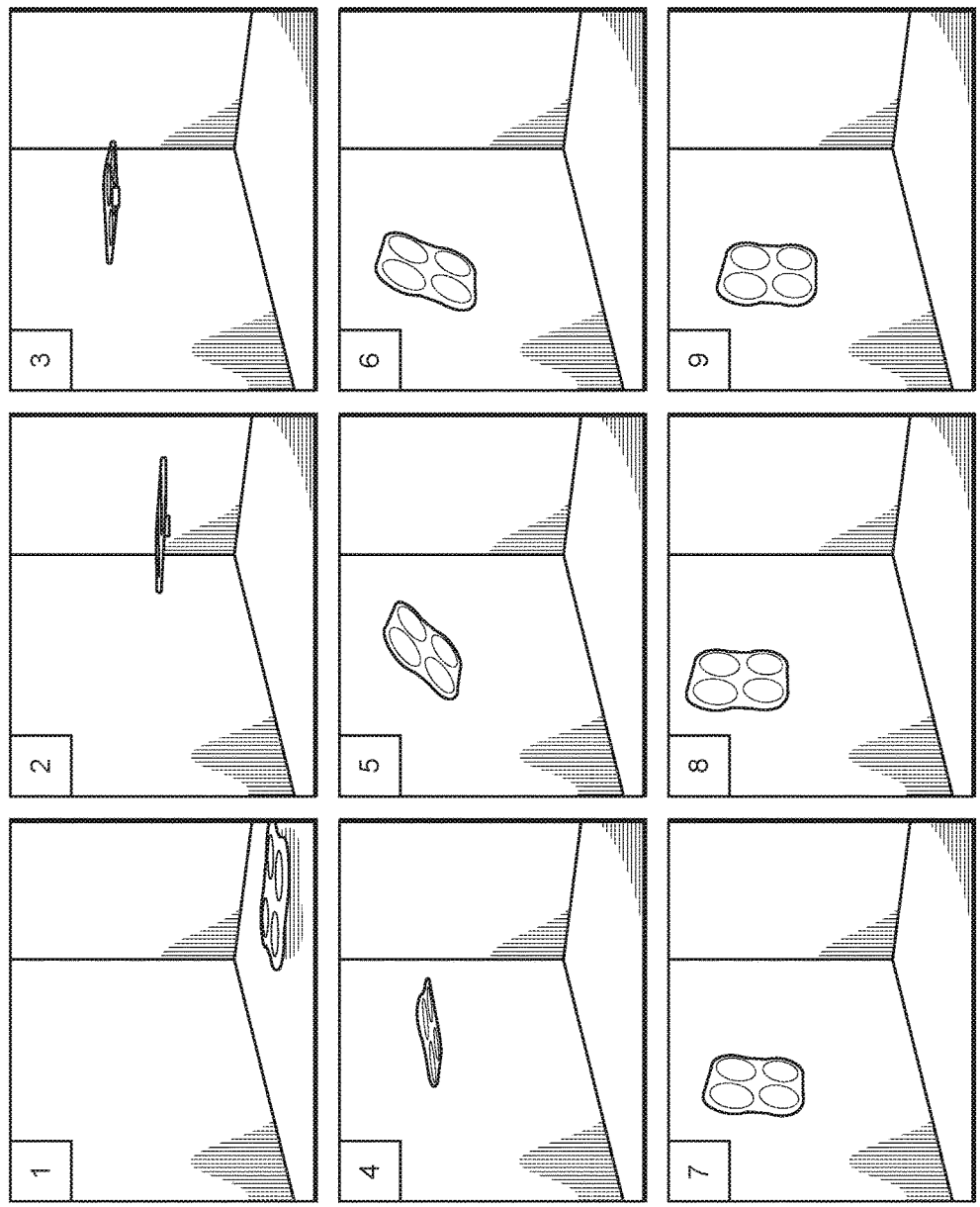
FIG. 5 illustrates pictures illustrating a wall attachment test of a non-contact type wall-climbing aerial robot according to an embodiment.

FIG. 5 illustrates pictures illustrating a wall attachment test of a non-contact type wall-climbing aerial robot according to an embodiment.

Referring to FIG. 5, the aerial robot may take off and approach a wall of a target. When approaching the wall of the target, the aerial robot may take an orientation and may be attached to the wall. Further, the aerial robot may detect a surface of the wall by using a vision sensor and may move.

According to an embodiment, the aerial robot may fly based on a quad-rotor, and a thrust force used while the aerial robot flies may be used as a force for attaching the aerial robot to the wall. Through this, a health degree of a large-scale building, a bridge, or a structure ay be stably inspected in a remote control. The controller may be designed through a dynamic analysis to control a posture for attachment to the wall. Further, a flight mode and a climbing mode may be autonomously modified by suggesting a control method for recognizing and attaching a wall so that the modes may be applied regardless of the type or state of the structure.

Hereinafter, an embodiment of a method of controlling the contact type wall-climbing aerial robot mechanism will be described in detail.

The contact type may be utilized when a frictional coefficient of contact portions of a wall and an aerial robot is known. In this case, because a force that is applied between the wall and the aerial robot may be estimated, the aerial robot may be landed stably as compared with the non-contact type while the wall and the aerial robot interact with each other.

In particular, because the aerial robot may supplement an upward propulsive force by generating a friction force in a direction that is opposite to the direction of the gravitational force while acting the wall, an abrupt orientation of the aerial robot, for maintaining a rising speed of the aerial robot as in the non-contact type is not necessary so that a landing impact may be reduced by allowing the aerial robot to take an orientation at a slow speed.

According to an embodiment, the thrust force may be used to generate an attachment force to the wall as well as for flight of the aerial robot. If the aerial robot is pushed towards the wall while the direction of the thrust force of the aerial robot faces the wall, the thrust force used for flight becomes a vertical drag between the aerial robot and the wall, and the aerial robot may be continuously attached while the aerial robot is not slid from the wall, by increasing a thrust force to increase a friction force between the aerial robot and the wall.

After the aerial robot is attached on the wall, the wheels are used to move the aerial robot on the wall, and an ultrasonic sensor for obtaining a distance between the aerial robot and the wall and direction information and a camera for inspecting a state of the wall on which the aerial robot is attached from a remote site may be additionally installed.

For example, the non-contact type wall-climbing aerial robot may be a quad-rotor based wall-climbing robot, and may generate a thrust force to fly by using four rotors. Further, after the aerial robot is attached to the wall, four wheels may be used such that the aerial robot may move on the wall.

Figure 6A:
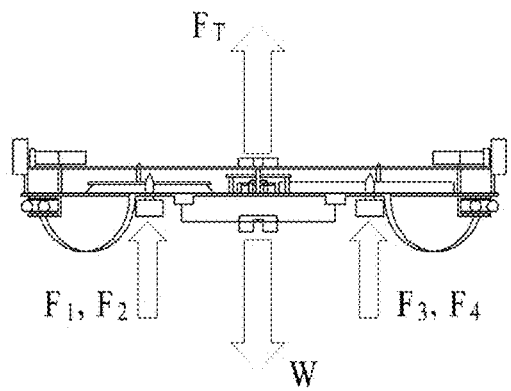
FIGS. 6A and 6B are diagrams for explaining a condition of a contact type wall-climbing aerial robot mechanism according to another embodiment.
Figure 6B:
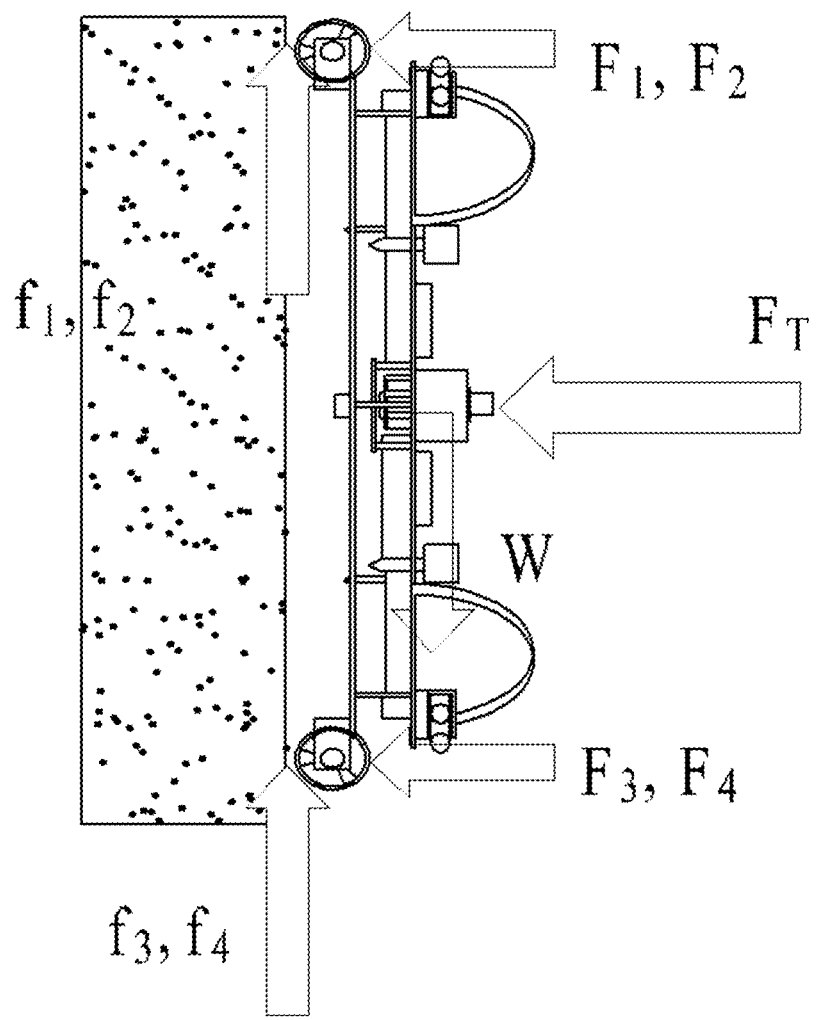

FIGS. 6A and 6B are diagrams for explaining a condition of a contact type wall-climbing aerial robot mechanism according to another embodiment.

FIG. 6A illustrates a flight condition, and a total s of all the thrust forces has to be larger than the weight of the aerial robot when the aerial robot is flying. FIG. 6B illustrates a wall attachment condition, and when the wall is assumed to be a vertical wall, a maximum static friction force between the aerial robot and the wall has to be larger than the weight of the aerial robot in order that the aerial robot may be continuously attached to the wall. Then, the maximum static friction force is a product of a frictional coefficient and a vertical drag, and the thrust force generated by the rotors of the aerial robot becomes a vertical drag between the aerial robot and the wall.

Accordingly, the two states may be satisfied depending on the magnitude of the thrust force. Meanwhile, a minimum necessary thrust force varies depending on whether the frictional coefficient is more than or less than 1, and the aerial robot may be always attached to the wall if a flight is possible as long as a friction force of not less than 1 can be achieved by applying a viscous material on the wheels of the aerial robot.

Figure 7:
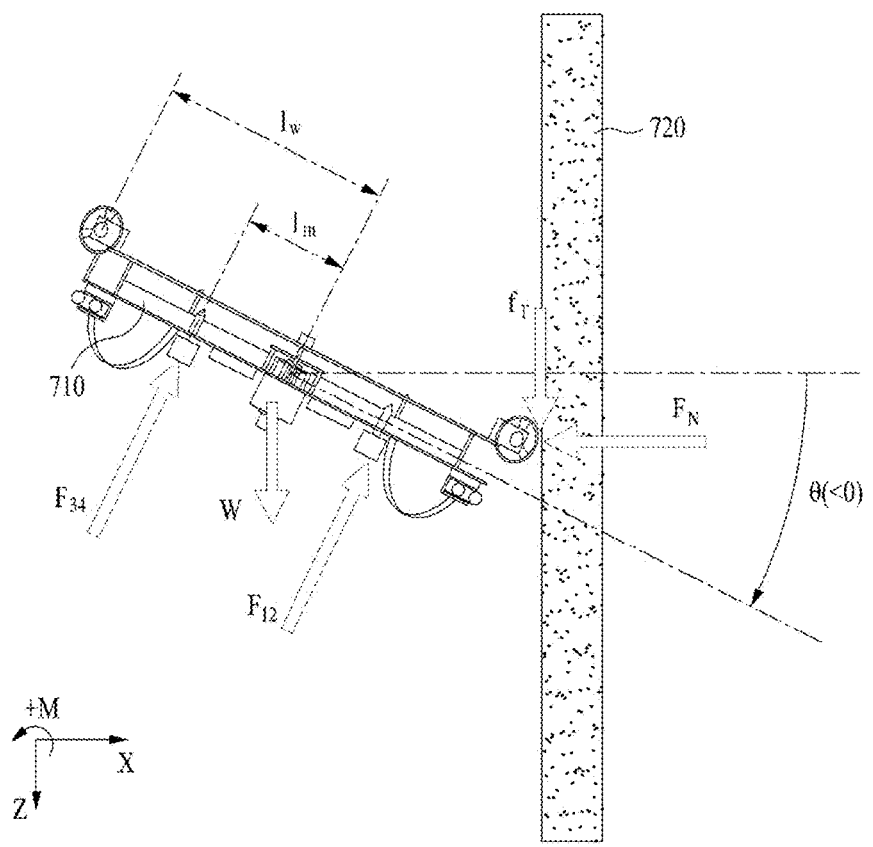
FIG. 7 is a diagram for explaining a contact type wall-climbing aerial robot mechanism according to another embodiment.

FIG. 7 is a diagram for explaining a contact wall-climbing aerial robot mechanism according to another embodiment.

FIG. 7 illustrate an orientation for attaching the aerial robot that is flying to the wall, and a distribution of forces when the aerial robot takes an orientation to be attached to the wall may be expressed in two dimensions.

A method of controlling a contact type wall-climbing aerial robot according to another embodiment may include an operation of an aerial robot 710 flying and approaching a structure, an operation of calculating a vertical drag and a friction force between the aerial robot 710 and a wall 720 of the structure through a motion of the aerial robot 710 from the dynamics of the aerial robot 710, an operation of obtaining inverse dynamics by inversely converting the dynamics to calculate a thrust force of the aerial robot 710 based on an inclination of the wall 720, an operation of the aerial robot 710 taking an orientation to be attached to the wall 720 of the structure, and an operation of the aerial robot 710 moving along the wall 720 of the structure to perform a task. Further, after moving along the wall 720 of the structure, the aerial robot 710 may be detached from the wall 720.

Here, in the operation of moving along the wall 720 of the structure to perform a task, when an obstacle is on the wall 720 of the structure, a flight mode in which the aerial robot flies with the rotors and a climbing mode in which the aerial moves with wheels may be automatically changed such that the aerial robot may pass by the obstacle.

In the operation of attaching the aerial robot to the wall 720 of the structure, the aerial robot 710 may be attached to the wall 720 of the structure by applying a thrust force of the aerial robot 710 towards the wall 720 of the structure while the aerial robot 710 is in contact with the wall of the structure and thus generating an attachment force towards the wall 720. A description of the same configurations as those of the method of controlling a wall-climbing aerial robot, which have been described in FIG. 3, will be omitted.

A contact type wall-climbing aerial robot mechanism may be suggested from the method of controlling a contact type wall-climbing aerial robot according to the second embodiment. Similarly to the description of FIG. 2, the contact type wall-climbing aerial robot mechanism according to another embodiment may include a flight controller, a vertical drag and friction force calculating unit, and a main processor. Here, the vertical drag and friction force calculating unit may calculate a vertical drag and a friction force between the aerial robot and the wall of the structure through a motion of the aerial robot from the dynamics of the aerial robot. Further, a thrust force of the aerial robot based on an inclination of the wall may be calculated by inversely converting the dynamics of the aerial robot to obtain inverse dynamics.

In this way, according to the method of controlling a contact type wall-climbing aerial robot, the aerial robot that has moved to the wall through a flight control may be attached to the wall while taking a posture thereof, and another controller other than the controller used in the process of taking an orientation may be used. When the controller used in flight is still used, the aerial robot may be crashed because a vertical drag and a friction force between the aerial robot and the wall cannot be sufficiently secure in the process of taking a posture. Accordingly, a controller that may allow the aerial robot to stably take an orientation with the least possibility of being crashed in consideration of a vertical drag and a friction force between the aerial robot and the wall.

Then, although a vertical drag between the aerial robot and the wall may be measured by using a farce sensor, a vertical drag and a friction force between the aerial robot and the wall may be estimated through a motion of the aerial robot from the analysis of the dynamics of the aerial robot to be utilized for control of the aerial robot because a sensor cannot be easily installed.

The dynamics of the aerial robot that is taking an orientation on the wall may be expressed as in the following equation.

$X$ component: $m\ddot{x}=(F_{12}+F_{34})\sin(-\theta)-F_N$ $Z$ component: $m\ddot{z}=-(F_{12}+F_{34})\cos(-\theta)+f_T+W$ $M$ component: $I_{yy}\ddot{\theta}=(F_{12}-F_{34})l_m-F_N l_w \sin(-\theta)-f_T l_w \cos(-\theta)$ [Equation 11]

Further, a vertical drag and a friction force between the wall and the aerial robot may be obtained as in the following equation from the motion in the x axis and the z axis. The inverse dynamics of the aerial robot that is taking an orientation on the wall may be expressed as in the following equation.

$F_N=-m\ddot{x}+(F_{12}+F_{34})\sin(-\theta)$ $f_T=m\ddot{z}-W+(F_{12}+F_{34})\cos(-\theta)$ [Equation 12]

Figure 8:
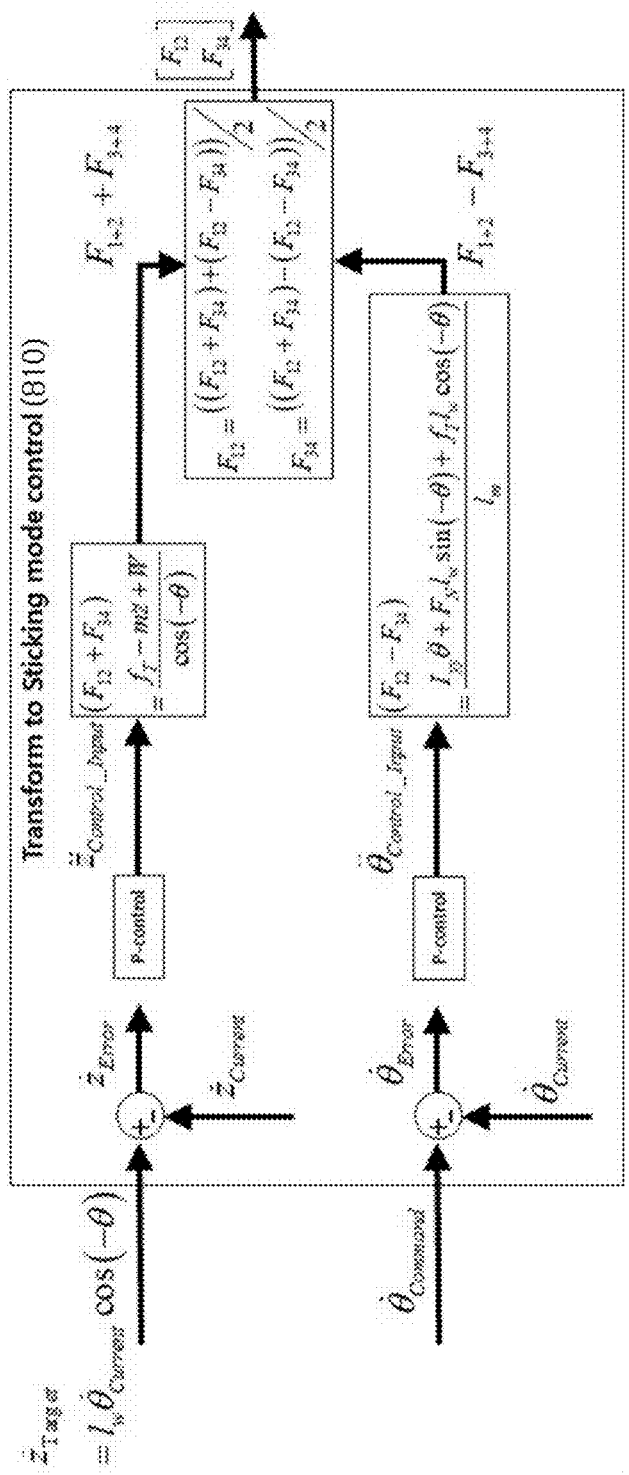
FIG. 8 is a view illustrating a controller for an orientation on a wall according to another embodiment.

FIG. 8 is a view illustrating a controller for an orientation on a wall according to another embodiment.

Referring to FIG. 8, inverse dynamics may be obtained from the dynamics and a controller 810 may be designed. Then, an objective of the controller 810 is to allow the aerial robot to take an orientation with the least possibility of being slid from the wall when the aerial robot is rotated to be attached to the wall.

Referring to FIG. 7, it can be seen that when the aerial robot is slide while being rotated towards the wall, the speed of the aerial robot generated due to the sliding influences only the z axis speed of the aerial robot. Accordingly, the controller 810 for the angular speed and the z axis speed of the aerial robot may be designed.

Figure 9:
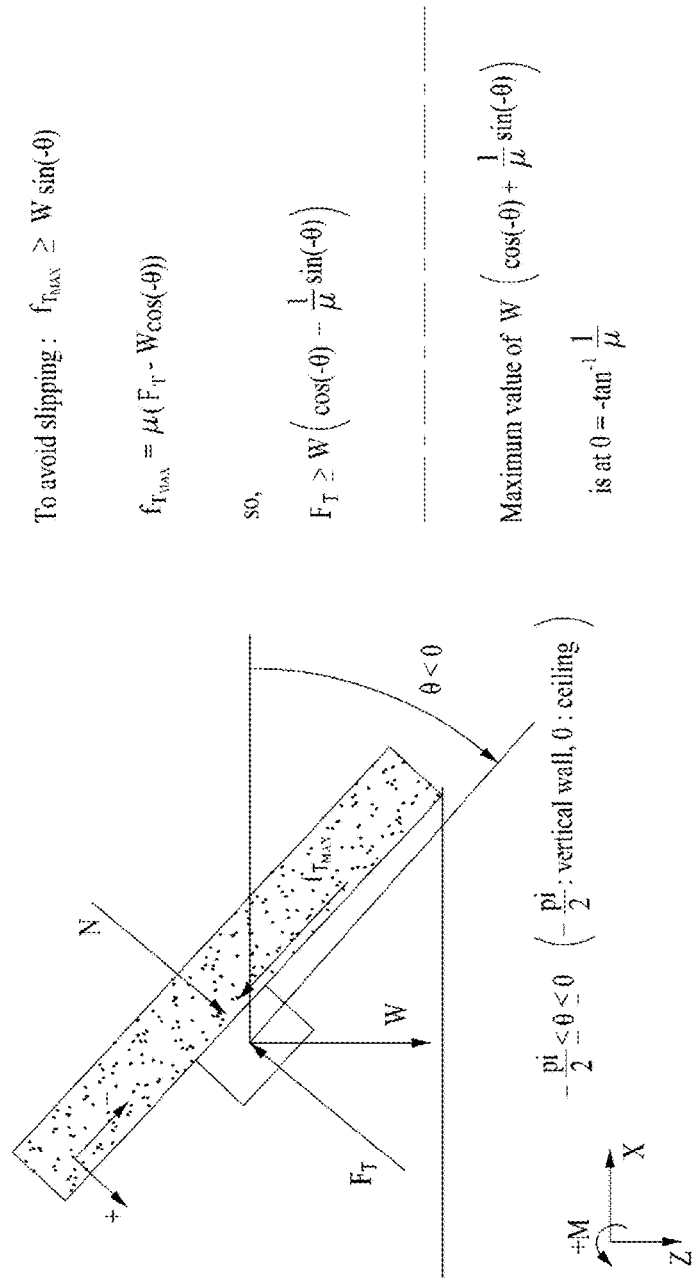
FIG. 9 is a view for explaining a minimum necessary thrust force depending on a change in an inclination of a wall according to another embodiment.

FIG. 9 is a view for explaining a minimum necessary thrust force depending on a change in an inclination of a wall according to another embodiment.

As described above, the aerial robot that has already taken an orientation on the wall may generate a thrust force for preventing the aerial robot from being slid when the wall is a vertical wall, and may be continue to be attached to the ceiling if the thrust force may allow hovering even when the wall is a ceiling. Many wall-climbing aerial robots are considering only a vertical wall or a ceiling when obtaining a maximum attachment three for preventing crashing or sliding. However, the wall-climbing aerial robot according to the inventive concept may be applied to a wall having an inclination.

The phenomenon may be verified with reference to FIG. 9. Referring to FIG. 9, a greater thrust force may be necessary on a wall having an inclination rather than on a vertical wall or a ceiling. Further, it may be different depending on the magnitude of a frictional coefficient, a greater thrust force is necessary on a wall having an inclination rather than on a vertical wall or a ceiling. That is, the aerial robot may require different forces of not less than a minimum thrust force depending on an inclination of the wall.

Figure 11:
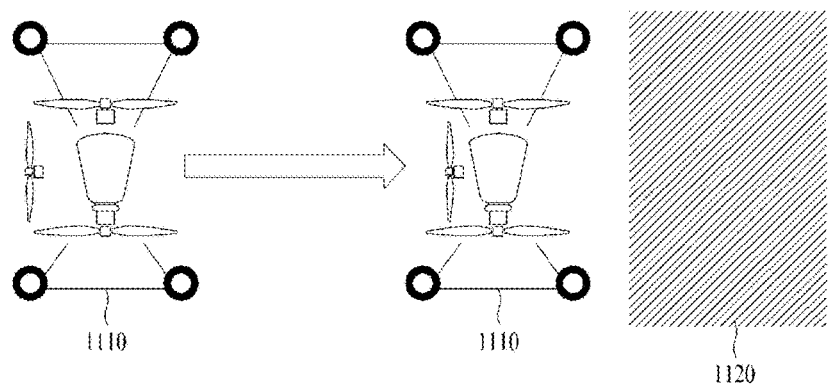
FIG. 11 is a diagram for explaining a method of controlling a non-contact type wall-climbing aerial robot mechanism according to another embodiment.

FIG. 11 is a diagram for explaining a method of controlling a non-contact type wall-climbing aerial robot according to another embodiment.

Referring to FIG. 11, the method of controlling a non-contact type wall-climbing aerial robot according to another embodiment may include an operation of allowing an aerial robot 1110 to fly toward a structure, an operation of allowing the aerial robot 1110 to approach a structure to recognize a wall 1120 of the structure, an operation of allowing the aerial robot 1110 to be attached to the wall 1120 of the structure by using a rotor that generates a thrust force in a direction that is perpendicular to a power source for flight, and an operation of allowing the aerial robot 1110 to move along the wall 1120 of the structure and generate an attachment force by using the rotor to perform a task.

The aerial robot 1110 may be attached to the wall 1120 of the structure by utilizing a propulsive body such as a rotor in a direction that is perpendicular to an existing flight power source as a vertical platform that does not require an orientation of the aerial robot 1110, and the aerial robot 1110 may be stabilized by generating an attachment three towards the wall 1120 by continuously using a rotor for movement of the aerial robot 1110 on the wall 1120. That is, the aerial robot 1110 may generate attachment fore towards the wall 1120 by operating the rotor towards the wall without having to taking a posture of the aerial robot 1110 such that the aerial robot 1110 may be attached to the wall 1120, and accordingly, the aerial robot 1110 may be attached to the wall 1120 of the structure.

Meanwhile, the aerial robot may approach the structure to recognize the wall of the structure.

Figure 12:
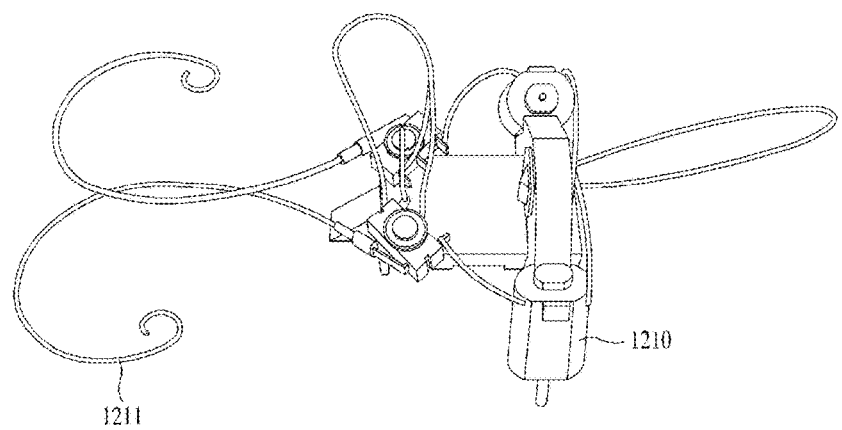
FIG. 12 is a diagram for explaining a method of recognizing a contact with a wall by using a touch sensor of an aerial robot according to another embodiment.

Referring to FIG. 12, the aerial robot 1210 may contact and recognize a wall of a structure by using a touch sensor 1211 provided in the aerial robot 1210 to recognize the wall of the structure. For example, the aerial robot 1210 may implement a mechanical contact obstacle recognizing sensor 1211 having a shape like an antenna of an insect.

Figure 13:
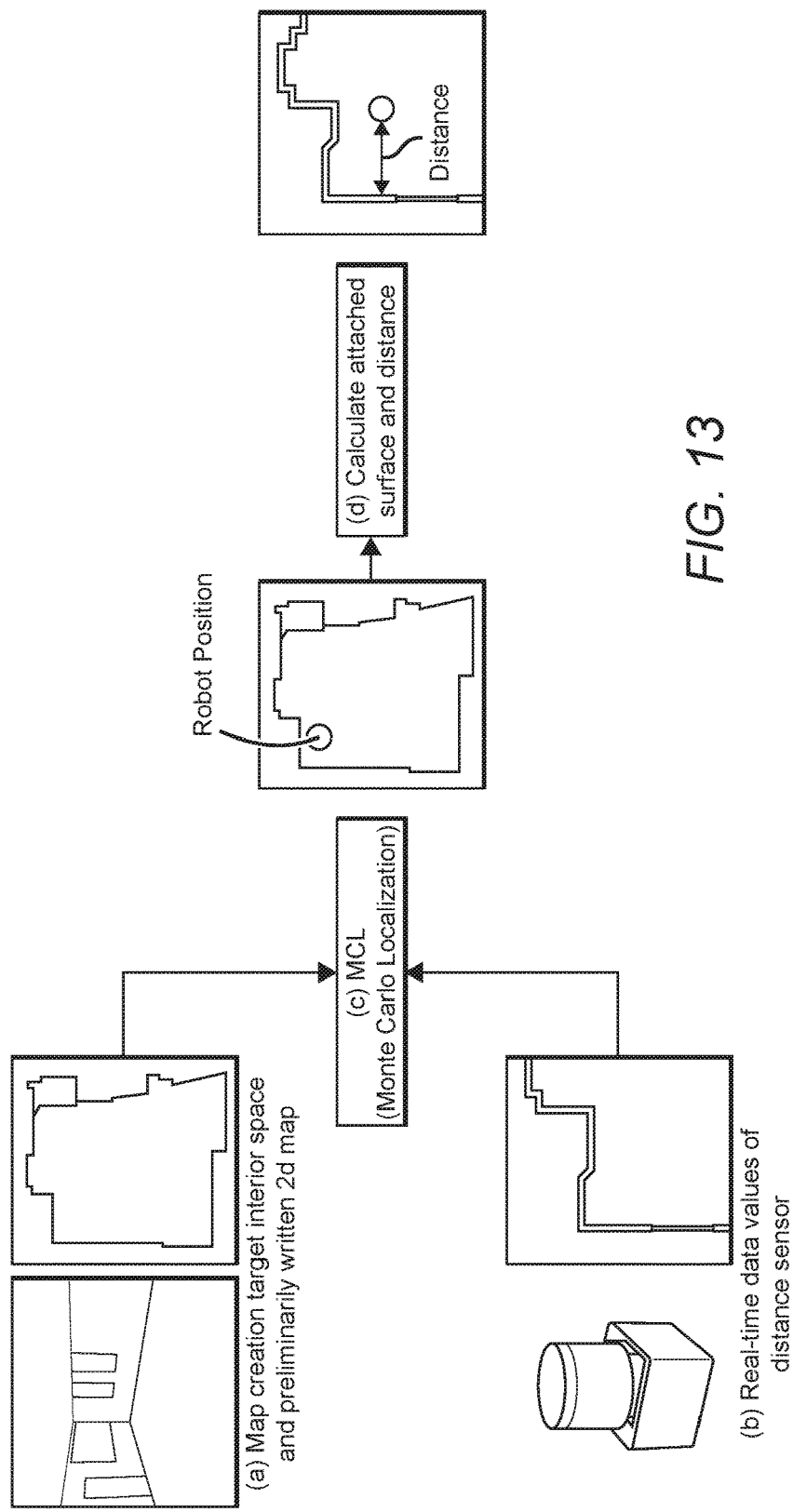
FIG. 13 is a diagram for explaining a method of recognizing a wall by using location information of an aerial robot according to another embodiment.

Referring to FIG. 13, a location of the aerial robot through a Monte Carlo localization (MCL) of real-time data values of the distance sensor of the aerial robot and map information stored in advance may be recognized, and may distance from the wall of the structure may be calculated with reference to the location of the aerial robot.

For example, a location of the aerial robot may be recognized by using real-time 2D LiDAR data values (real-time data values of a distance sensor) of the aerial robot and a Monte Carlo localization (MCL) between a map creation target interior space and preliminarily written 2D map information, and the wall of the structure may be recognized by calculating a distance from the wall of the structure with reference to the location of the aerial robot.

Figure 14:
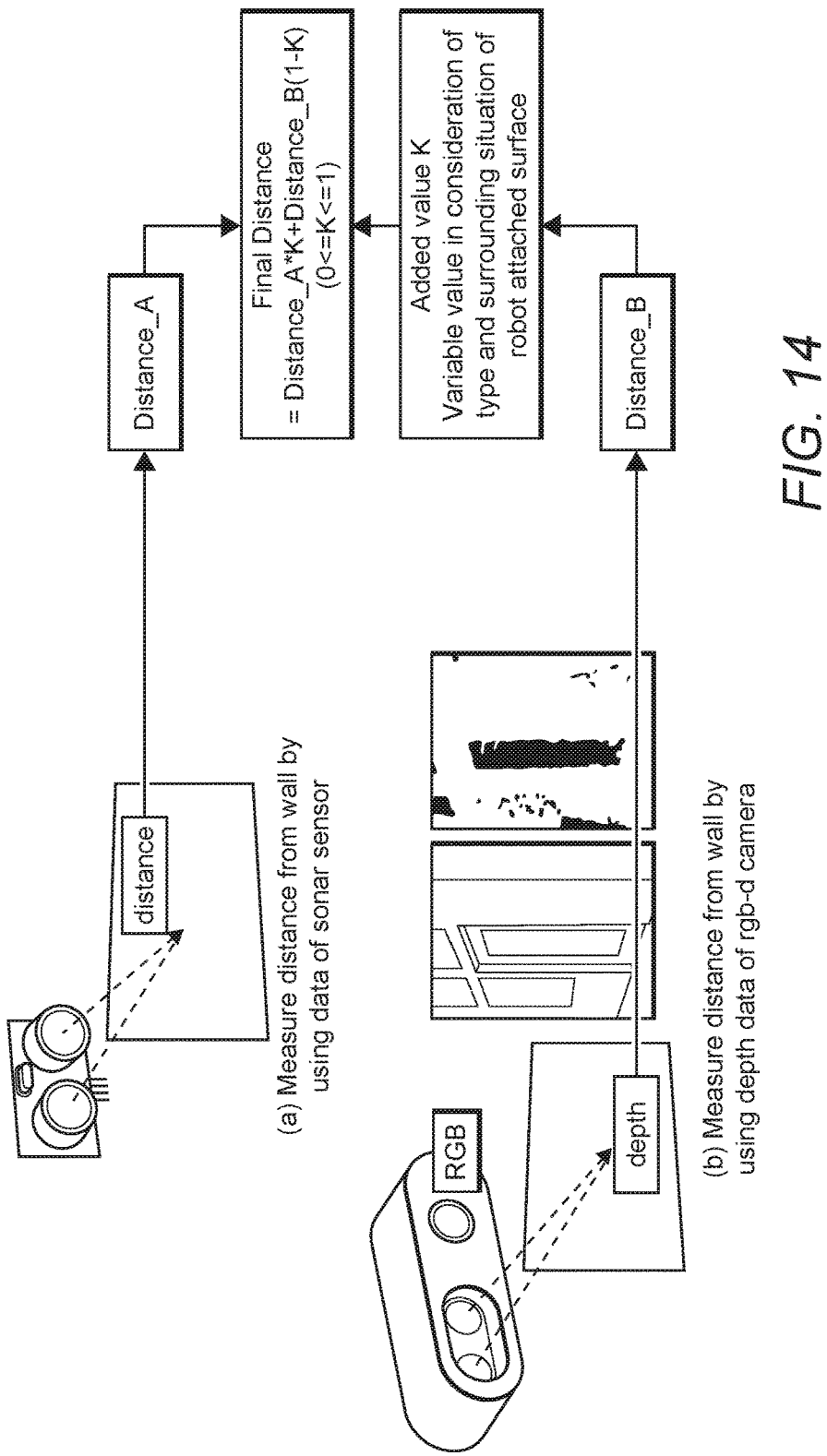
FIG. 14 is a diagram for explaining a method of recognizing a wall by using a sonar sensor and an RGB-D sensor according to another embodiment.

Referring to FIG. 14, the wall 220 of the structure may be recognized by mutually supplementing a distance measurement value based on sonar sensor data formed in the aerial robot 210 and a distance measurement value based on depth value of the RGB-D sensor.

For example, when the aerial robot is to be attached to a glass wall, a precise distance may be measured by a sonar sensor but cannot be measured by an RGB-D sensor using light. Further, when the wall is an uneven and convexo-concave wall, the wall may be recognized more accurately by compensating for a large error of a calculated distance value of a sonar sensor with a distance value of an RGB-D sensor.

Figure 15:
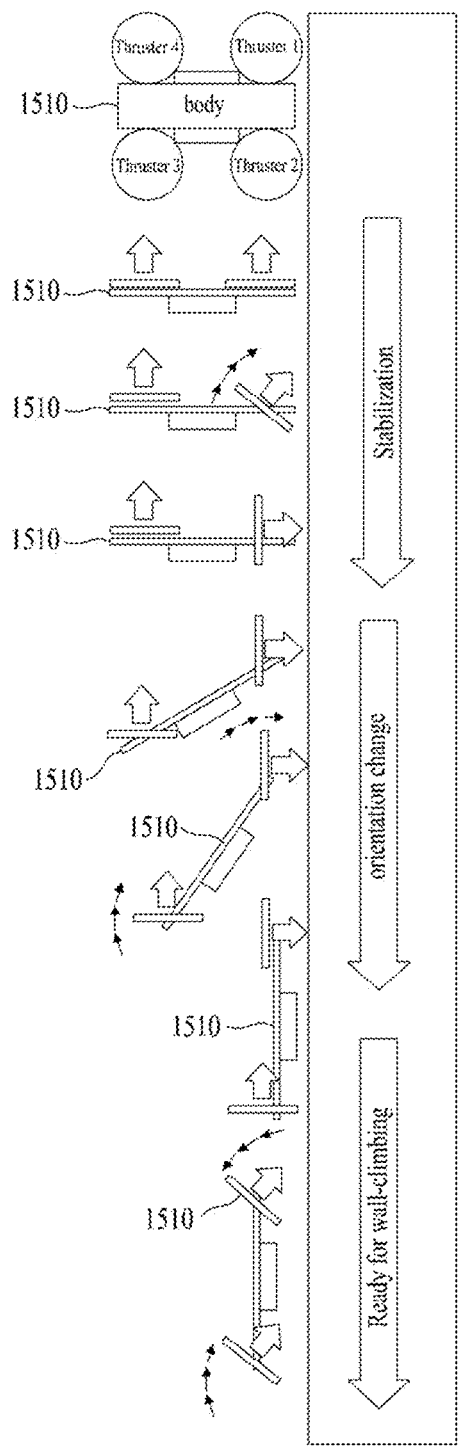
FIG. 15 is a diagram for explaining a method of controlling a non-contact type wall-climbing aerial robot mechanism according to another embodiment.

FIG. 15 is a diagram for explaining a method of controlling a non-contact type wall-climbing aerial robot according to another embodiment.

Referring to FIG. 15, the method of controlling a non-contact type wall-climbing aerial robot according to another embodiment may include an operation of allowing an aerial robot 1510 to fly toward a structure, an operation of allowing the aerial robot 1510 to approach a structure to recognize a wall of the structure, an operation of allowing the aerial robot 1510 to be attached to the wall of the structure after some of a plurality of rotors that generate a thrust force in a rising direction of the aerial robot such that the aerial robot is attachable on the wall of the structure; and an operation of allowing the aerial robot 1510 to move along the wall of the structure and generate an attachment force by using the rotor to perform a task.

For example, a contact with the wall of the structure may be recognized by using a physical touch sensor formed in the aerial robot 1510. As another example, a location of the aerial robot 1510 through a Monte Carlo localization (MCL) of real-time data values of the distance sensor of the aerial robot 1510 and map information stored in advance may be recognized, and a distance from the wall of the structure may be calculated with reference to the location of the aerial robot 1510. As another example, the wall of the structure may be recognized by mutually supplementing a distance measurement value based on sonar sensor data formed in the aerial robot 1510 and a distance measurement value based on the depth value of the RGB-D sensor.

Figure 16:
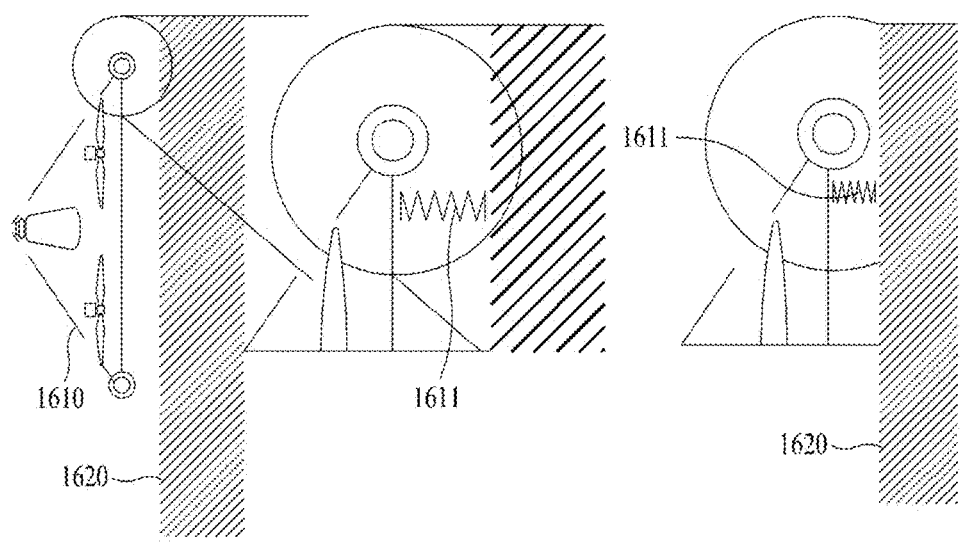
FIG. 16 is a diagram for explaining an aerial robot provided with a resilient member according to another embodiment.

Further, because an attachment force towards the wall may be generated by adjusting the magnitude and the direction of the thrust force of the aerial robot 1510 to apply the thrust force towards the wall of the structure, the aerial robot 1510 may be attached to the wall of the structure. Moreover, as illustrated in FIG. 16, a resilient member 1611 may be provided at a portion of the aerial robot 1610, which is attached to the wall 1620 of the structure so that the aerial robot 1610 may be attached to the wall 1620 of the structure or pass by an obstacle by using the thrust force and the resilient force of the aerial robot 1610.

Further, the method of controlling a non-contact type wall-climbing aerial robot according to another embodiment may include an operation of allowing an aerial robot to fly and approach a structure, an operation of allowing the aerial robot to calculate a vertical drag and a friction force between the aerial robot and the wall of the structure through a motion of the aerial robot from the dynamics of the aerial robot, an operation of allowing the aerial robot to calculate a thrust of the aerial robot by inversely converting the dynamics of the aerial robot to obtain inverse dynamics, an operation of allowing the aerial robot to take an orientation and be attached to the wall of the structure, and an operation of allowing the aerial robot to move along the wall of the structure to perform a task.

Further, the method may further include an operation of flying and being detached from the wall of the structure after moving along the wall of the structure performing a task.

As described above, embodiments provide an aerial robot mechanism that allows flight and wall climbing by producing a force by which the aerial robot may be attached to the wall only with a thrust force of the rotors in a non-infra aerial robot platform. A disadvantage of continuously regenerating an attachment force, making it difficult for the non-infra based aerial robots to return to the wall and causing a crash accident and requiring additional external equipment for generating the attachment force when the aerial robots deviate from the wall may be overcome.

Further, according to the embodiments, because a thrust force of the rotor is used to generate an attachment force (a vertical drag between the robot and the wall) to the wall as well as flight, additional external equipment is not necessary and the weight of the aerial robot is less restricted, so that additional equipment such as a camera or a laser distance measurer (for example, an LRF) may be mounted on the aerial robot to safely monitor a large scale structure. Because an additional apparatus for attaching the aerial robot to the wall is not necessary, the weight of the aerial robot is less restricted, so that additional equipment for performing various tasks may be attached and may be applied to structures of various states and environments.

Moreover, the aerial robot based wall-climbing aerial robot platform technology is expected to preoccupy technical power of the world highest level for a next-generation new-growth power industry due to development of the convergence technology of the intelligent aerial robot that is tried for the first time in the world. Further, due to the trend of high and large-scale buildings of the whole world, the inventive concept is expected to achieve a very high employment creation effect as a business model that develops anew market in employing new manpower and creating employments, and is expected to achieve a high economical effect according to the sales volume for enlarging the businesses of the domestic market and developing the abroad market, and for follow-up managements, after the products are commercialized. Further, through commercialization of GPSs, various sensor application technologies, and H/W and S/W technologies on a wall utilizing an aerial robot, a business competitiveness can be reinforce and an infer for an abroad market can be expected by securing growth power of high added value industries and securing main components/materials and original technologies.

The foregoing devices may be realized by hardware elements, software elements and/or combinations thereof. For example, the devices and components illustrated in the exemplary embodiments of the inventive concept may be implemented in one or more general-use computers or special-purorientation computers, such as a processor, a controller, an arithmetic logic unit (ALU), a digital signal processor, a microcomputer, a field programmable array (FPA), programmable logic unit (PLU), a microprocessor or any device which may execute instructions and respond. A processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described exemplary embodiments of the inventive concept may be implemented with program instructions which may be executed through various computer means and may be recorded in computer-readable media. The media may also include, alone or in combination with the program instructions, data files, data structures, and the like. The program instructions recorded in the media may be designed and configured specially for the exemplary embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to act as one or more software modules to perform the operations of the above-described exemplary embodiments of the inventive concept, or vice versa.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, the other implementations, other embodiments, and the equivalents of the claims pertain to the scope of the claims.

According to the embodiments, because a technology of an aerial robot mechanism for both flight and wall-climbing, which generates a force by which the aerial robot may be attached to the wall only with a thrust force of a rotor in a non-infra based aerial robot platform and a method of controlling the same are provided, a disadvantage of the existing aerial robots in which the aerial robots cannot return to the walls, causing a crash accident and requiring additional external equipment for generating an attachment force when the non-infra based wall-climbing robots deviate from the wall can be overcome by continuously regenerating an attachment force.

According to the embodiments, the aerial robot may start from the ground without any help of an operator, be automatically attached to a wall, perform a given task, and be detached from the wall, and may use a thrust force of a rotor to generate an attachment force (a vertical drag between the robot and the wall) as well as flight thereof so that additional external equipment is not necessary and a large-scale structure may be safely monitored by mounting additional equipment such as a camera or an LRF.

Further, according to the embodiments, a flight mode and a climbing mode may be autonomously changed by suggesting a control method of recognizing a wall and attaching the aerial robot to the wall, so that a wall-climbing aerial robot mechanism that may be applied regardless of the type and state of the structure and a method of controlling the same may be provided.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method of controlling a wall-climbing aerial robot, the method comprising:

allowing the aerial robot to fly towards a structure;
allowing the aerial robot to approach the structure and recognize a wall of the structure;
allowing the aerial robot to be attached to the wall of the structure by using a rotor that generates a thrust force in a direction that is perpendicular to a force generated by a flight power source of the aerial robot; and
allowing the aerial robot to move along the wall of the structure by generating an attachment force using the rotor such that the aerial robot performs a task.

2. The method of claim 1, wherein the allowing the aerial robot to recognize the wall comprises:
allowing the aerial robot to contact and recognize the wall of the structure using a physical touch sensor provided in the aerial robot.

3. A method of controlling a wall-climbing aerial robot, the method comprising:
allowing the aerial robot to fly towards a structure;
allowing the aerial robot to approach the structure and recognize a wall of the structure;
allowing the aerial robot to be attached to the wall of the structure based on one or more of a plurality of rotors generating a thrust force in a rising direction of the aerial robot such that the aerial robot is on the wall of the structure; and
allowing the aerial robot to move along the wall of the structure by generating an attachment force using one or more of said plurality of rotors such that the aerial robot performs a task.

4. The method of claim 3, wherein the allowing the aerial robot to recognize the wall comprises:
allowing the aerial robot to contact and recognize the wall of the structure using a physical touch sensor provided in the aerial robot.

5. The method of claim 3, wherein the allowing the aerial robot to recognize the wall comprises:
allowing the aerial robot to recognize a location of the aerial robot through a Monte Carlo localization (MCL) between a real-time data value of a distance sensor of the aerial robot and map information stored in advance to calculate a distance from the wall of the structure with reference to the location of the aerial robot.

6. The method of claim 3, wherein the allowing the aerial robot to recognize the wall comprises:
allowing the aerial robot to recognize the wall of the structure by mutually supplementing a data based distance measurement value of a sonar sensor provided in the aerial robot and a distance measurement value based on a depth value of an RGB-D sensor.

7. The method of claim 3, wherein the allowing the aerial robot to be attached to the wall comprises:
adjusting a magnitude and direction of the thrust force such that said thrust force becomes said attachment force, said attachment force directed toward the wall, the aerial robot being provided with a resilient member at a portion that is attached to the wall of the structure; and
adjusting a magnitude and direction of the attachment force such that said attachment force becomes a resilient force for passing by an obstacle.

8. The method of claim 3, further comprising:
allowing the aerial robot to, after moving along the wall of the structure to perform a task, fly to be detached from the wall of the structure.

9. A method of controlling a wall-climbing aerial robot, the method comprising:

allowing the aerial robot to fly towards a structure;
allowing the aerial robot to approach the structure and recognize a wall of the structure;
allowing the aerial robot to calculate a trajectory for landing on the wall of the structure, to take an orientation using at least a first thrust force generated by the aerial robot, after taking the orientation to approach the wall of the structure, and to be attached on the wall of the structure using at least a second thrust force generated by the aerial robot; and
allowing the aerial robot to move along the wall of the structure to perform a task.

10. The method of claim 9, wherein the allowing the aerial robot to recognize the wall comprises:
allowing the aerial robot to contact and recognize the wall of the structure using a physical touch sensor provided in the aerial robot.

11. The method of claim 9, wherein the allowing the aerial robot to recognize the wall comprises:
allowing the aerial robot to recognize a location of the aerial robot through a Monte Carlo localization (MCL) between a real-time data value of a distance sensor of the aerial robot and map information stored in advance to calculate a distance from the wall of the structure with reference to the location of the aerial robot.

12. The method of claim 9, wherein the allowing the aerial robot to recognize the wall comprises:
allowing the aerial robot to recognize the wall of the structure by mutually supplementing a data based distance measurement value of a sonar sensor provided in the aerial robot and a distance measurement value based on a depth value of an RGB-D sensor.

13. The method of claim 9, wherein the allowing the aerial robot to be attached to the wall comprises:
allowing the aerial robot to obtain the trajectory by expressing dynamics of the aerial robot in differential equations for an angular acceleration, an angular velocity, and an orientation, and reflecting a measured distance from the wall and a weight and an inertial moment of the aerial robot to calculate the first thrust force; and
allowing the aerial robot to take the orientation by applying the first thrust force and approaching the wall of the structure along the trajectory.

14. The method of claim 9, wherein the allowing the aerial robot to move along the wall of the structure comprises:
when an obstacle is on the wall of the structure, allowing the aerial robot to automatically change a flight mode in which the aerial robot flies with a rotor and a climbing mode in which the aerial robot travels with wheels to pass by the obstacle.

15. The method of claim 9, further comprising:
allowing the aerial robot to, after moving along the wall of the structure to perform a task, fly to be detached from the wall of the structure using a third thrust force.

16. The method of claim 9, wherein a plurality of rotors collectively produce both the first thrust force and the second thrust force.

17. The method of claim 16, wherein said plurality of rotors each produces the same magnitude and direction of force to produce said second thrust force.

18. The method of claim 16, wherein when said plurality of rotors is collectively producing the first thrust force, a first one of said plurality of rotors is producing a different magnitude of force and/or direction of force than a second one of said plurality of rotors.

19. The method of claim 3, wherein the one or more of said plurality of rotors for generating the thrust force is the same as the one or more of said plurality of rotors for generating the attachment force.

20. The method of claim 3, wherein at least one of the plurality of rotors is for both generating the thrust force and generating the attachment force.

* * * * *